US007177626B2

(12) United States Patent
Hintermeister et al.

(10) Patent No.: US 7,177,626 B2
(45) Date of Patent: Feb. 13, 2007

(54) RELAYING OF MESSAGES

(75) Inventors: Gregory Richard Hintermeister, Rochester, MN (US); Michael David Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 10/660,218

(22) Filed: Sep. 11, 2003

(65) Prior Publication Data

US 2005/0059381 A1 Mar. 17, 2005

(51) Int. Cl.
*H04Q 7/22* (2006.01)

(52) U.S. Cl. ............................... 455/412.1; 455/412.2; 455/413; 455/414.1

(58) Field of Classification Search ............. 455/412.1, 455/414.1, 11.1, 13.1, 510, 67.11, 436, 421, 455/563, 412.2, 414.2, 413, 416, 417, 466, 455/514, 456.1, 456.2, 456.3, 456.4, 456.5, 455/456.6, 432.1, 433, 435.1; 379/201.01, 379/201.06, 201.07, 207.1, 210.01; 709/217, 709/218, 219, 250
See application file for complete search history.

(56) References Cited

U.S. PATENT DOCUMENTS

| | | | |
|---|---|---|---|
| 5,689,802 A | 11/1997 | Luzzatto | |
| 5,705,980 A | 1/1998 | Shapiro | |
| 5,850,593 A | 12/1998 | Uratani | |
| 5,890,054 A | 3/1999 | Logsdon et al. | |
| 5,937,355 A | 8/1999 | Joong et al. | |
| 5,966,663 A * | 10/1999 | Gleason ...................... 455/466 |
| 6,064,876 A * | 5/2000 | Ishida et al. .............. 455/412.1 |
| 6,678,517 B2 * | 1/2004 | Naim et al. ............... 455/414.1 |
| 6,681,107 B2 * | 1/2004 | Jenkins et al. ........... 455/412.1 |
| 6,895,257 B2 * | 5/2005 | Boman et al. ............ 455/556.1 |
| 2002/0090947 A1 * | 7/2002 | Brooks et al. .............. 455/436 |
| 2002/0187788 A1 * | 12/2002 | McKay ........................ 455/450 |
| 2004/0203607 A1 * | 10/2004 | Satapathy ................. 455/412.1 |
| 2004/0203645 A1 * | 10/2004 | Forman et al. ........... 455/414.1 |
| 2004/0203948 A1 * | 10/2004 | Provost et al. .............. 455/466 |
| 2005/0048981 A1 * | 3/2005 | Anupam et al. ............ 455/445 |
| 2005/0111647 A1 * | 5/2005 | Mashinsky ............. 379/210.01 |
| 2005/0130632 A1 * | 6/2005 | Park ........................ 455/414.1 |

FOREIGN PATENT DOCUMENTS

| | | |
|---|---|---|
| CA | 2407827 A1 | 11/2001 |
| WO | 97/23993 A2 | 7/1997 |

OTHER PUBLICATIONS

Are You Ready for Multimedia Messaging Service. An Evolutionary Approach to Implementing MMS, Nokia White Paper, 2002, pp. 1-11.

* cited by examiner

*Primary Examiner*—Jean Gelin
*Assistant Examiner*—Olumide Ajibade-Akonai
(74) *Attorney, Agent, or Firm*—Owen J. Gamon

(57) ABSTRACT

A method, apparatus, system, and signal-bearing medium that in an embodiment detect that a connection is lost while a call is in progress, prompt for a message in response to the detection, and save the message until the connection is available. After the connection is available, the message is automatically sent to the party to the call. In this way, information that was cut off when the connection was lost can be completed in an convenient manner. In another embodiment, the user may enter a message or messages for a designated recipient or recipients at any time, and the message(s) is saved and automatically sent when the connection becomes available.

11 Claims, 6 Drawing Sheets

RELAYING OF MESSAGES

FIELD

This invention generally relates to telecommunications and more specifically relates to the relaying of messages between telephones.

BACKGROUND

Although cellular telephones have become very popular, they are plagued by problems of intermittent connections, which are quite annoying and inconvenient for the users. Intermittent connections can be caused by interference from buildings, hills, and other structures or can be caused when the cellular telephone is located on the edge of the transmission range. Intermittent connections are especially a problem when the user is moving, such as when driving, because the cellular telephone signal may be within range and unobstructed one moment, but shortly thereafter the user may move into a valley, behind a building, or simply move out of range, and the connection can then be lost.

In order to help the user with the problem of intermittent connections, some cellular phones display a signal-strength indicator on a user interface. This allows the user to monitor the indicator in order to determine when the signal strength is sufficient to make a call and also to determine when the signal strength is weakening and is about to be lost. Unfortunately, monitoring the signal-strength indicator is inconvenient, distracting, and cumbersome for the user, and may even be dangerous if the user is driving a moving vehicle.

Without a better way to handle intermittent connections, using a cellular telephone will continue to be inconvenient and frustrating for the user.

SUMMARY

A method, apparatus, system, and signal-bearing medium are provided that in an embodiment detect that a connection is lost while a call is in progress, prompt for a message in response to the detection, and save the message until the connection is available. After the connection is available, the message is automatically sent to the party to the lost call. In this way, information that was cut off when the connection was lost can be completed in an convenient manner. In another embodiment, the user may enter a message or messages for a designated recipient or recipients at any time, and the message(s) is saved and automatically sent when the connection becomes available.

DETAILED DESCRIPTION

In an embodiment, a telephone detects that a connection is lost while a call is in progress and in response prompts the user to enter a message to send to the other party of the disconnected call. The telephone then saves the entered message and waits to send the message until the connection is once again available. A server that connects telephones in a network saves messages in a transcript, which parties can retrieve or send to others at a later time. In this way, information that was cut off when the connection was lost can be completed in an convenient manner.

Figure 1:
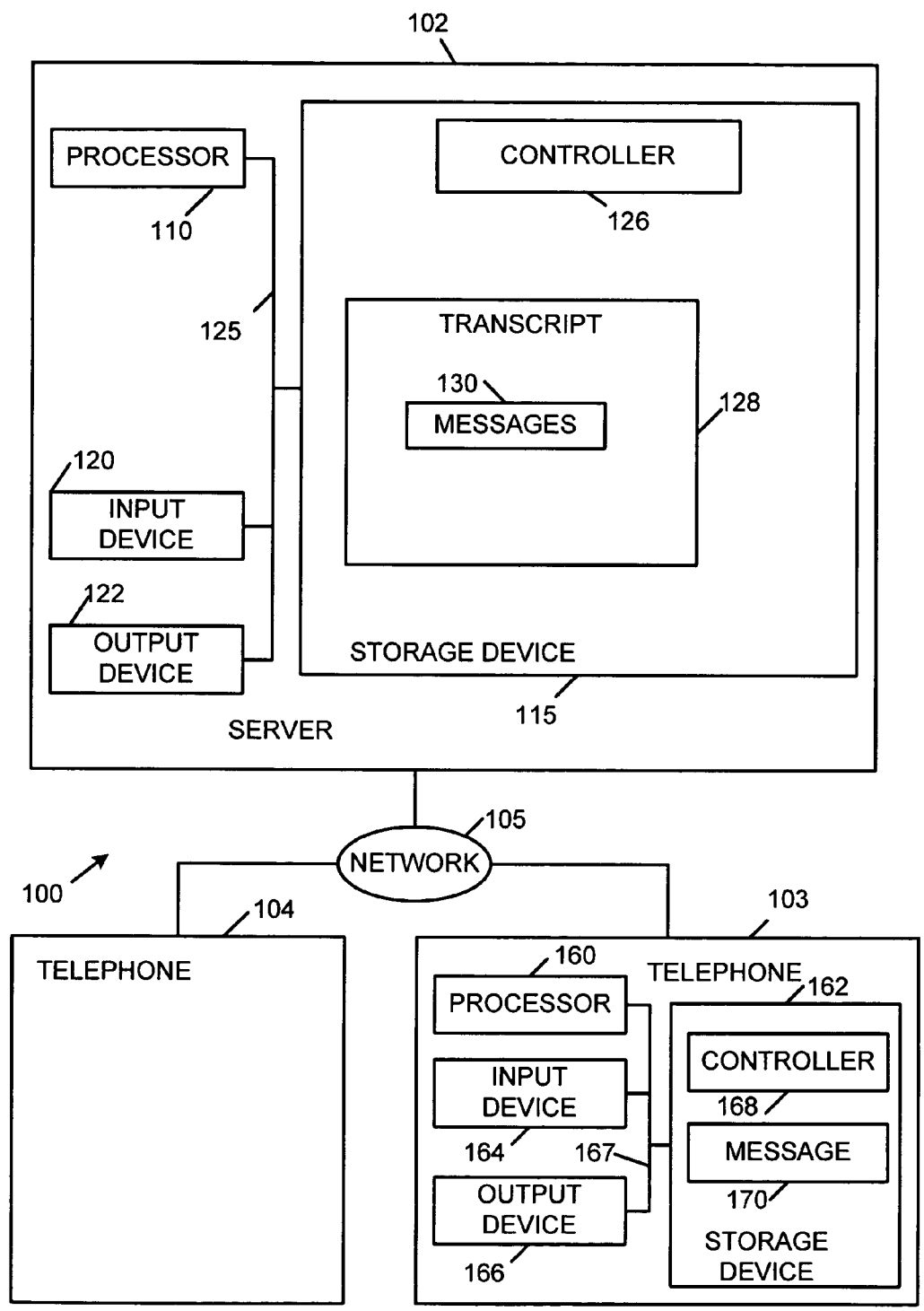
FIG. 1 depicts a block diagram of an example system for implementing an embodiment of the invention.

FIG. 1 depicts a block diagram of an example system 100 for implementing an embodiment of the invention. The system 100 includes a server 102, a telephone 103, and a telephone 104, all connected via a network 105. Although only one server 102, two telephones 103 and 104, and one network 105 are shown, in other embodiments any number or combination of them may be present.

The server 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the server 102 that controls the operation of the entire server. Although not depicted in FIG. 1, the processor 110 typically includes a control unit that organizes data and program storage in memory and transfers data and other information between the various parts of the server 102. The processor 110 reads and/or writes code and data to/from the storage device 115, the network 105, the input device 120, and/or the output device 122.

Although the server 102 is shown to contain only a single processor 110 and a single bus 125, other embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, hard disk media, floppy disk media, tape media, CD (compact disk) media, DVD (digital video disk or digital versatile disk) media, optical storage media, flash memory devices, and/or other machine-readable media. In other embodiments, any appropriate type of storage device may be used. Although only one storage device 115 is shown, multiple storage devices and multiple types of storage devices may be present. Further, although the server 102 is drawn to contain the storage device 115, the storage device 115 may be external to the server 102 and/or may be distributed across other electronic devices, such as devices connected to the network 105.

The storage device 115 includes a controller 126 and a transcript 128. The controller 126 routes messages between the telephones 103 and 104 and saves and retrieves messages to/from the transcript 128. In an embodiment, the controller 126 includes instructions capable of executing on the processor 110 or statements capable of being interpreted by instructions executing on the processor 110 to carry out the functions as further described below with reference to FIG. 6. In another embodiment, the controller 126 may be implemented either partially or completely in hardware via logic gates and/or other appropriate hardware techniques in lieu of or in addition to a processor-based system.

The transcript 128 includes one or more messages 130. The controller 126 organizes the messages 130 in the transcript 128 by sender and receiver, as further described below with reference to FIG. 6. Although only one transcript 128 is illustrated, in other embodiments any number of transcripts may be present. In various embodiments, the messages 130 may include audio, video, text, data, or any combination thereof.

Although the controller 126 and the transcript 128 are both illustrated as being contained within the storage device 115 in the server 102, in other embodiments they may be on different storage devices and/or on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the server 102 and/or to manipulate the user interfaces of the server 102. Although only one input device 120 is shown, in another embodiment any number (including zero) and type of input devices may be present.

The output device 122 is that part of the server 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The server 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, client computers, server computers, and mainframe computers are examples of other possible configurations of the server 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The telephone 103 includes a processor 160, a storage device 162, an input device 164, and an output device 166, all connected directly or indirectly via a bus 167. Although the telephone 103 is depicted in FIG. 1 as being a stand-alone system, in other embodiments the telephone 103 may be embedded as part of another device, such as a modem, fax machine, automobile, appliance, laptop or notebook computer, pager, PDA (Personal Digital Assistant), or any other appropriate device.

The processor 160 may be analogous to the processor 110 previously described above. The storage device 162 may be analogous to the storage device 115 previously described above and includes a controller 168 and a message 170.

The controller 168 includes instructions capable of executing on the processor 160 or statements capable of being interpreted by instructions executing on the processor 160 to carry out the functions as further described below with reference to FIGS. 3, 4, and 5. In another embodiment, the controller 160 may be implemented either partially or completely in hardware via logic gates and/or other appropriate hardware techniques in lieu of or in addition to a processor-based telephone. The message 170 is analogous to the message 130 previously described above and may be a message that the telephone 103 has received and/or a message that the telephone 103 sends.

The input device 164 may be a keyboard, mouse or other pointing device, trackball, touchpad, touchscreen, keypad, microphone, voice recognition device, or any other appropriate mechanism for the user to input audio, video, text, data, or any combination thereof to the telephone 103 and/or to manipulate the user interfaces of the telephone 103. Although only one input device 164 is shown, in another embodiment any number of input devices of the same type or of different types may be present.

The output device 166 is that part of the telephone 103 that presents output to the user. The output device 166 may be a display, speaker, or any other appropriate output device or combination thereof. Although only one output device 166 is shown, in other embodiments, any number of output devices of the same type or of different types may be present.

The bus 167 is analogous to the bus 125 previously described above.

The telephone 104 may be analogous to the telephone 103 as previously described above and may be the same or a different type of telephone and may be connected through the same type of network or a different type of network as the telephone 103.

The network 105 may be any suitable network or combination of networks and may support any appropriate protocol suitable for communication of data and/or code between the server 102, the telephone 103, and the telephone 104. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the server 102 and/or the telephone 103, and that, when read and executed by one or more processors in the server 102 and/or the telephone 103, cause the electronic device to perform the steps necessary to execute steps or elements embodying the various aspects of an embodiment of the invention.

Moreover, while embodiments of the invention have and hereinafter will be described in the context of fully functioning electronic devices, such as the server 102 and the telephone 103, the various embodiments of the invention are capable of being distributed as a program product in a variety of forms, and the invention applies equally regardless of the particular type of signal-bearing medium used to actually carry out the distribution. The programs defining the functions of this embodiment may be delivered to the server 102, the telephone 103, and/or the telephone 104 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
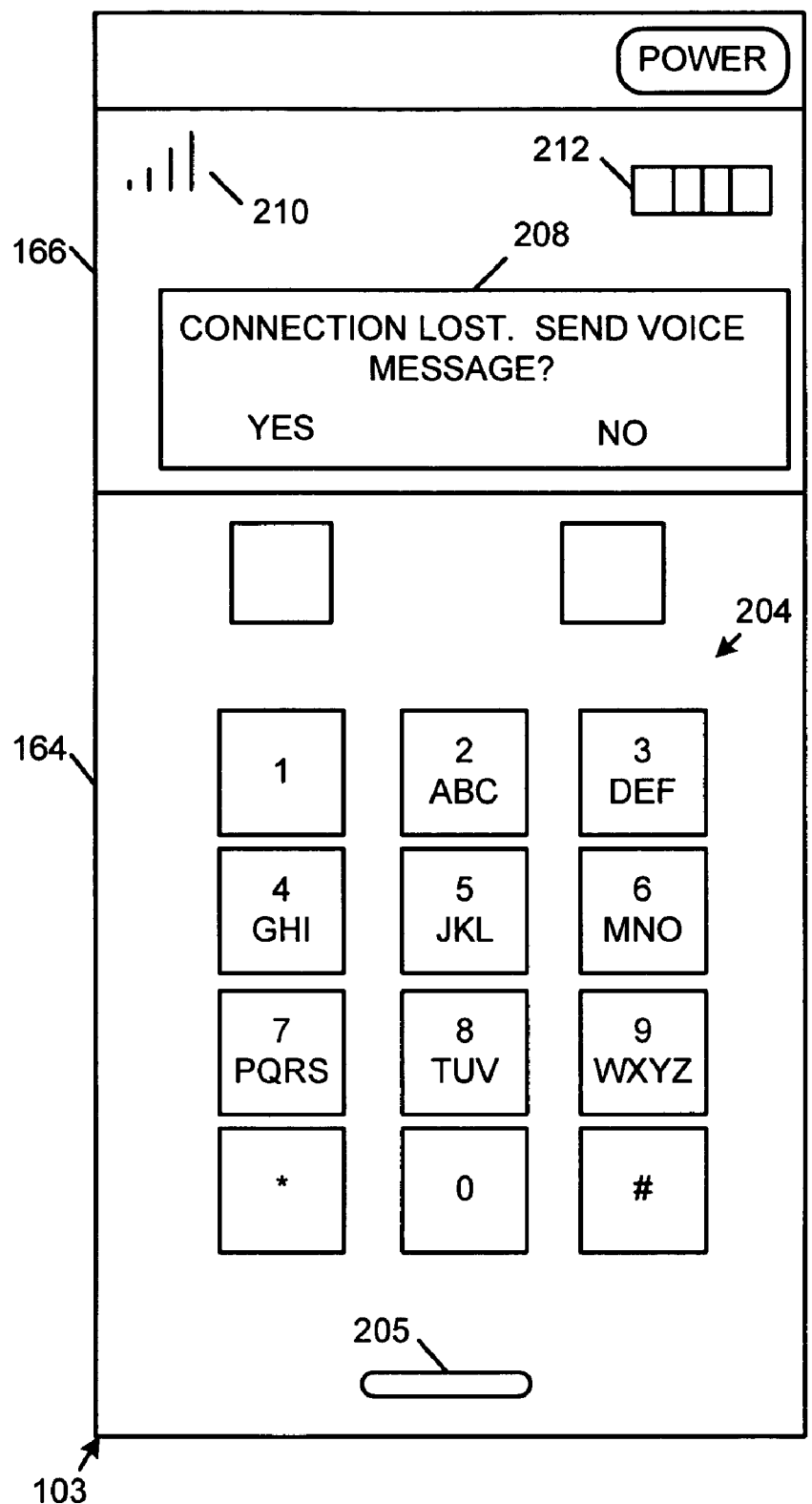
FIG. 2 depicts a pictorial representation of an example user interface, according to an embodiment of the invention.

FIG. 2 depicts a pictorial representation of an example user interface of the telephone 103, according to an embodiment of the invention. The telephone 103 includes the input device 164 and the output device 166, both previously described above with reference to FIG. 1. In the example shown, the input device 164 includes various keys 204 and a microphone 205. The user may utilize the keys 204 of the input device 164 to enter commands and numbers, but in other embodiments any appropriate technique for entering commands and/or data via an input device may be used, and other input elements may be present.

Displayed on the output device 166 are a message area 208, a signal-strength indicator 210, and a battery-strength indicator 212. In the example shown, the message area 208 displays "Connection Lost. Send voice message?" In other embodiments, the message area 208 may include "Message Received," indicating that the server 102 received a message from the telephone 103 and "Message Sent," indicating that the server 102 sent a message from the telephone 103 to another telephone, but in another embodiments any appropriate message may be used. In other embodiments more or fewer user interface elements may be presented via the output device 166.

Figure 3:
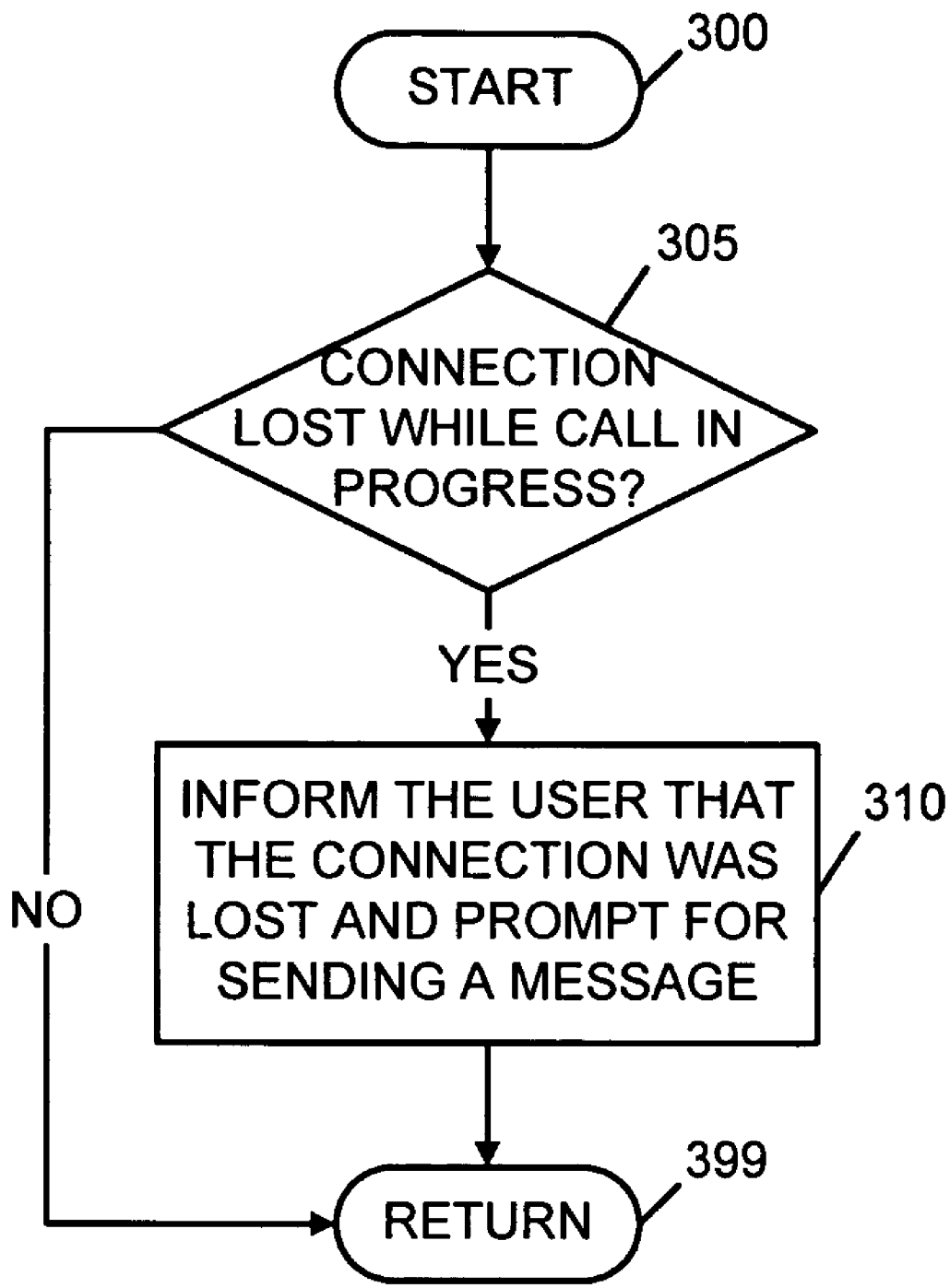
FIG. 3 depicts a flowchart of example processing for a telephone when a connection is lost, according to an embodiment of the invention.

FIG. 3 depicts a flowchart of example processing for the telephone 103, according to an embodiment of the invention. Control begins at block 300. Control then continues to block 305 where the controller 168 determines whether a connection across the network 105 was lost while a call at the telephone 103 was in progress and one of the participants did not initiate the disconnection. If the determination at block 305 is true, then the controller 168 detected a lost connection while a call was in progress, so control continues to block 310 where the controller 168 informs the user that the connection was lost via the output device 166 (e.g., via the message shown in the message area 208 in FIG. 2) and prompts the user for an opportunity to send a message to a party to the call (e.g., the telephone 104). Control then continues to block 399 where the function returns.

If the determination at block 305 is false, then the connection was not lost while a call was in progress, so control continues from block 305 to block 399 where the function returns.

Figure 4:
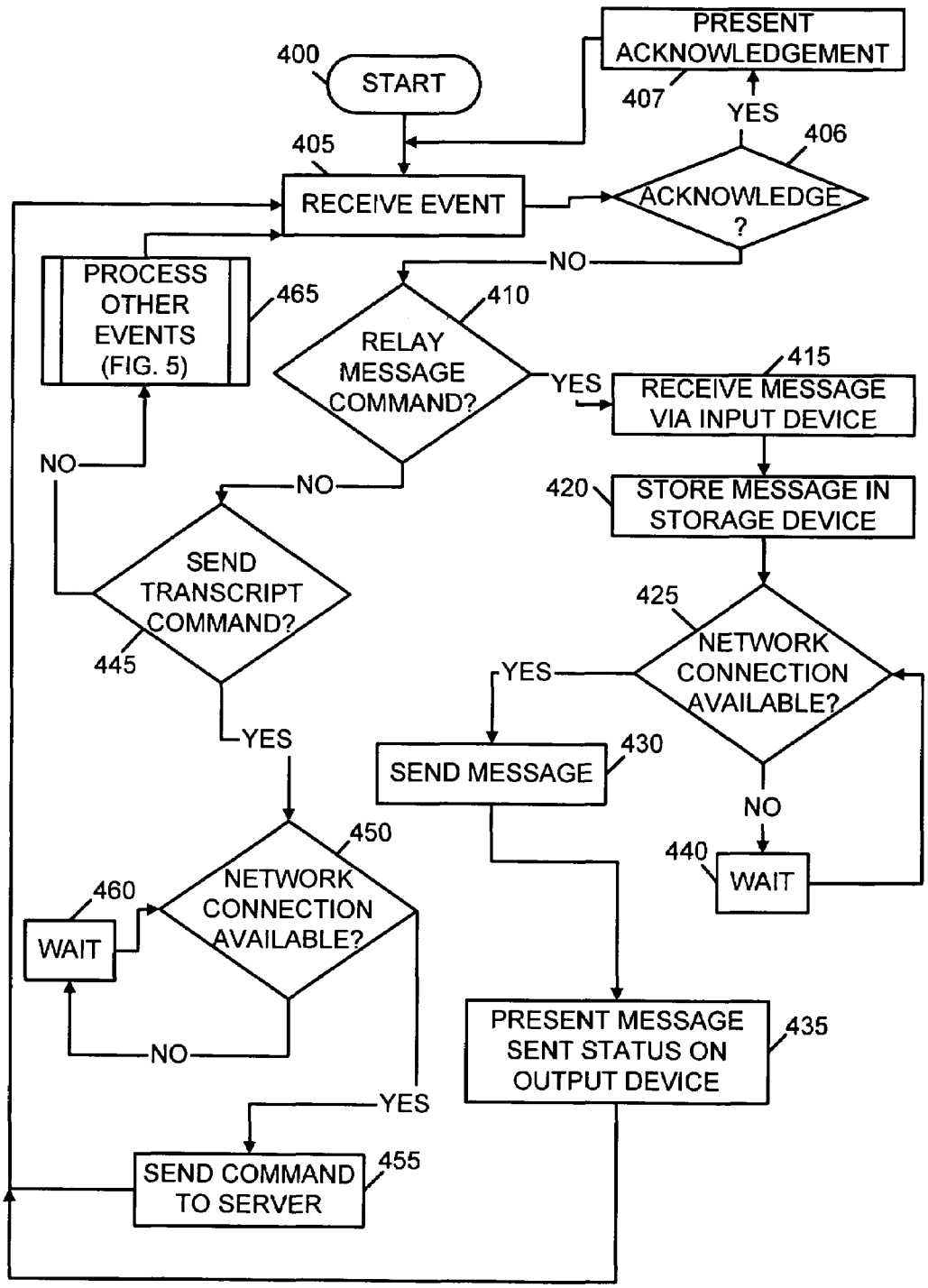
FIG. 4 depicts a flowchart of example event processing for a telephone, according to an embodiment of the invention.

FIG. 4 depicts a flowchart of example processing for received events at the telephone 103, according to an embodiment of the invention. Control begins at block 400. Control then continues to block 405 where the controller 168 receives an event either via the input device 164 or across the network 105. Control then continues to block 406 where the controller 168 determines whether the event received at block 405 is an acknowledgement received across the network 105 from the server 102. If the determination at block 406 is true, then control continues to block 407 where the controller 168 presents an acknowledgement message via the output device 122, e.g., in the message area 208. Examples of acknowledgement messages are "Message Received," indicating that the server 102 received a message from the telephone 103 and "Message Sent," indicating that the server 102 sent a message from the telephone 103 to another telephone, but in other embodiments any appropriate acknowledgement may be used. Control then returns to block 405 as previously described above.

If the determination at block 406 is false, then control continues to block 410 where the controller 168 determines whether the event received at block 405 is a relay message command received via the input device 164. In an embodiment, the relay message command occurs in response to a detection that a connection was lost while a call was in progress, as previously described above with reference to FIG. 3. In another embodiment, the relay message command occurs in response to a user initiating a message or messages at any time for any designated recipient regardless of whether a call was interrupted by a lost connection. If the determination at block 410 is true, then the received command is a relay message command, so control continues to block 415 where the controller 168 receives a message(s) via the input device 164. Control then continues to block 420 where the controller 168 stores the received message(s) in the message 170 in the storage device 162. In an embodiment, the controller 168 receives and stores multiple messages prior to proceeding.

Control then continues to block 425 where the controller 168 determines whether a network connection is available. If the determination at block 425 is true, then a connection across the network 105 is available, so control continues to block 430 where the controller 168 assembles the message 170 and sends the message across the network 105 to a party to the lost call (e.g., the telephone 104) or to a recipient designated by the user via the server 102. In an embodiment, the controller 168 assembles the message into packets prior to transmission. Control then continues to block 435 where the controller 168 presents status via the output device 166 indicating that the message has been sent. In the example of FIG. 2, the controller 168 presents status via the message area 208. Control then returns to block 405 as previously described above.

If the determination at block 425 is false, then a connection across the network 105 is not available, so control continues to block 440 where the controller 168 waits for a period of time. Control then returns to block 425 as previously described above. In this way, the controller 168 saves the message and waits until a network connection is available and then sends the message after the connection is available.

If the determination at block 410 is false, then the event is not a relay message command, so control continues to block 445 where the controller 168 determines whether the received event is a send transcript command. In various embodiments, the send transcript command may request that previously-sent messages be forwarded to a specified destination, such as the requesting telephone (e.g., telephone 103) or another telephone (e.g., the telephone 104). Examples of previously-sent messages are the transcript 128, selected messages within the transcript 128, or messages that were sent between the telephone 103 and a selected other telephone (e.g., telephone 104).

If the determination at block 445 is true, then control continues to block 450 where the controller 168 determines whether a network connection is available. If the determination at block 450 is true, then control continues to block 455 where the controller 168 sends the transcript command to the server 102. Control then returns to block 405 as previously described above.

If the determination at block 450 is false, then a network connection is not available, so control continues to block 460 where the controller 168 waits for a period of time. Control then returns to block 450 as previously described above. In this way, the controller 168 waits until a connection across the network 105 is available before sending the transcript command to the server 102.

If the determination at block 445 is false, then the received event is not a send transcript command, so control continues to block 465 where the controller 168 processes other events, as further described below with reference to FIG. 5. Control then returns to block 405 as previously described above.

Figure 5:
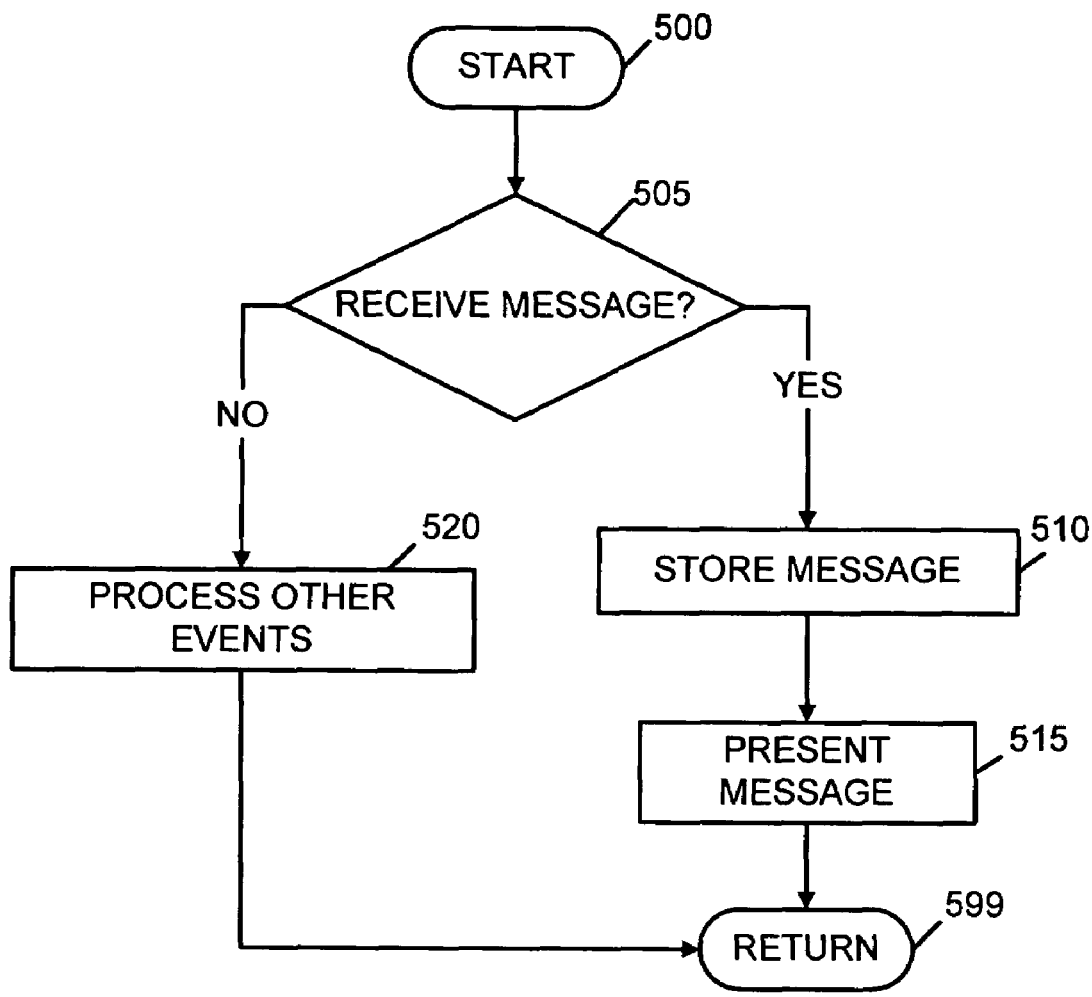
FIG. 5 depicts a flowchart of example event processing for a telephone, according to an embodiment of the invention.

FIG. 5 depicts a flowchart of example message processing for a telephone, according to an embodiment of the invention. Control begins at block 500. Control then continues to block 505 where the controller 168 determines whether the received event is a message(s) from the server 102. In an embodiment, the message(s) is received from the server 102 in response to a transcript command initiated by the current telephone (the telephone 103) or initiated by another telephone (e.g., the telephone 104). In another embodiment, the received message was sent by another telephone, e.g., the telephone 104.

If the determination at block 505 is true, then control continues to block 510 where the controller 168 optionally stores the received message(s) in the message 170. Control then continues to block 515 where the controller 168 optionally presents the received message(s) via the output device 166. Control then continues to block 599 where the logic of FIG. 5 returns.

If the determination at block 505 is false, then the received event is not a message, so control continues to block 520 where the controller 168 processes any other optional events. Control then continues to block 599 where the logic of FIG. 5 returns.

Figure 6:
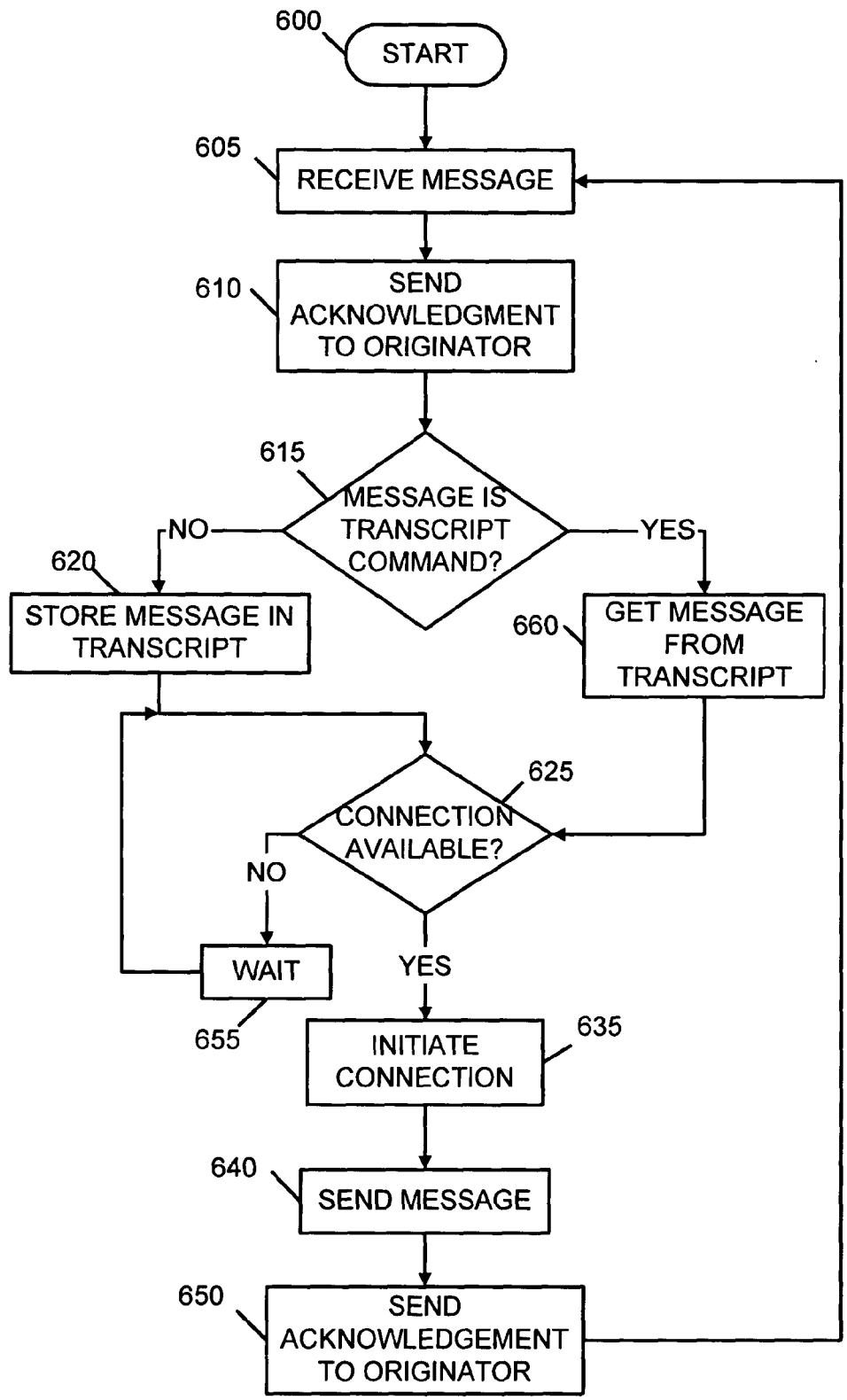
FIG. 6 depicts a flowchart of example processing for a server, according to an embodiment of the invention.

FIG. 6 depicts a flowchart of example processing for the server 102, according to an embodiment of the invention. Control begins at block 600. Control then continues to block 605 where the controller 126 receives a message from the network 105, e.g., from the telephone 103. Control then continues to block 610 where the controller 126 sends an acknowledgement to the originator of the message, such as the telephone 103. Control then continues to block 615 where the controller 126 determines whether the received message is a transcript command.

If the determination at block 615 is false, then the message is not a transcript command, so control continues to block 620 where the controller 126 stores the message in the message 130 in the transcript 128. In an embodiment, the controller 126 stores messages by sender and receiver within the transcript 128.

Control then continues to block 625 where the controller 126 determines if a connection is available across the network 105. If the determination at block 625 is true, then a connection is available, so control continues to block 635 where the controller 126 initiates a connection across the network 105. Control then continues to block 640 where the controller 126 assembles the message, messages, or transcript and sends the message, messages, or transcript across the network 105 to the destination, e.g., the telephone 104. In an embodiment, the controller 168 assembles the message into packets prior to transmission. Control then continues to block 650 where the controller 126 sends an acknowledgement to the originator, e.g., the telephone 103, of the message previously received at block 605 indicating that the message has been sent. Control then returns to block 605 as previously described above.

If the determination at block 625 is false, then control continues to block 655 where the controller 126 waits for a period of time. Control then returns to block 625 as previously described above. In this way the controller 126 waits until a connection is available before sending the message.

If the determination at block 615 is true, then the message is a transcript command, so control continues to block 660 where the controller 126 retrieves the requested transcript 128 or a selected message or messages within the transcript 128, depending on the received transcript command. The transcript command may include a designation of a destination where the transcript or selected message(s) is to be sent (as further described above with reference to block 640) and a criteria. The criteria may identify or designate a sender and a receiver. Thus, at block 660 the controller 126 may select message(s) from the transcript 128 that were previously sent by the designated sender and/or previously received by the designated receiver. Control then continues to block 625 as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
  detecting that a connection is lost while a call between a telephone and a party is in progress;
  prompting via the telephone for a user-entered message in response to the detecting;
  saving the user-entered message until the connection is available;
  sending the user-entered message after the connection is available to the party of the call; and
  sending a transcript command from the telephone to a server after the connection is available, wherein the transcript command comprises a designated destination, a designated sender, and a designated receiver, wherein the transcript command requests the server to select previously-sent messages from a transcript stored at the server that were previously sent by the designated sender and were previously received by the designated receiver, wherein the transcript command further requests the server to send the selected previously-sent messages to the designated destination, wherein the designated destination comprises the telephone.

2. The method of claim 1, wherein the sending further comprises:
  sending the user-entered message to the party of the call via the server.

3. The method of claim 2, further comprising:
  receiving an acknowledgment from the server; and
  presenting the acknowledgment.

4. An apparatus comprising:
  means for detecting that a connection is unavailable while a call between a telephone and a party is in progress;
  means for receiving at least one user-entered message via the telephone;
  means for saving the at least one user-entered message until the connection is available;
  means for sending the at least one user-entered message to the party of the call after the connection is available; and
  means for sending a transcript command from the telephone to a server after the connection is available, wherein the transcript command comprises a designated destination, a designated sender, and a designated receiver, wherein the transcript command requests the server to select previously-sent messages from a transcript stored at the server that were previously sent by the designated sender and were previously received by the designated receiver, wherein the transcript command further requests the server to send the selected previously-sent messages to the designated destination, wherein the designated destination comprises the telephone.

5. The apparatus of claim 4, wherein the means for sending the at least one user-entered message further comprises:
  means for sending the at least one user-entered message via the server.

6. The apparatus of claim 5, further comprising:
  means for receiving an acknowledgment that the at least one user-entered message was received at the server; and
  means for presenting the acknowledgment.

7. The apparatus of claim 5, further comprising:
  means for receiving an acknowledgment that the at least one user-entered message was sent from the server to the party; and
  means for presenting the acknowledgment.

8. A signal-bearing medium encoded with instructions, wherein the instructions when executed comprise:
  detecting that a connection is lost while a call between a telephone and a party is in progress;
  prompting for a user-entered message via the telephone in response to the detecting;
  receiving the user-entered message in response to the prompting;
  determining whether the connection is available;
  if the connection is unavailable, saving the user-entered message until the connection is available;
  sending the user-entered message to the party of the call after the connection is available; and
  sending a transcript command from the telephone to a server after the connection is available, wherein the transcript command comprises a designated destination, a designated sender, and a designated receiver, wherein the transcript command requests the server to select previously-sent messages from a transcript stored at the server that were previously sent by the designated sender and were previously received by the designated receiver, wherein the transcript command further requests the server to send the selected previously-sent messages to the designated destination, wherein the designated destination comprises the telephone.

9. A server comprising:
  a processor; and
  a storage device encoded with instructions, wherein the instructions when executed on the processor comprise:
    receiving a command, wherein the command designates a destination and a criteria, and wherein the command is sent to the server from a telephone in response to the telephone detecting that a connection is lost while a call from the telephone to a party is in progress,
    retrieving a transcript of previously-sent messages at the server based on the criteria, wherein the retrieving further comprises selecting previously-sent messages from a transcript stored at the server that were previously sent by the designated sender and were previously received by the designated receiver,
    receiving a user-entered message that was prompted for in response to the telephone detecting that the connection was lost,
    determining whether the connection is available, and
    when the connection is available, sending the transcript of previously-sent messages and the user-entered message to the destination, wherein the destination comprises the telephone.

10. The server of claim 9, wherein the instructions further comprise:
  sending an acknowledgement to the telephone after the receiving.

11. The server of claim 9, wherein the instructions further comprise:
  sending an acknowledgment to the telephone after the sending.

* * * * *